(12) United States Patent
Yabe et al.

(10) Patent No.: US 8,785,833 B2
(45) Date of Patent: Jul. 22, 2014

(54) IMAGE PICKUP SYSTEM AND IMAGE PICKUP METHOD

(71) Applicant: Olympus Medical Systems Corp., Tokyo (JP)

(72) Inventors: Yusuke Yabe, Chofu (JP); Tomoya Takahashi, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/951,889

(22) Filed: Jul. 26, 2013

(65) Prior Publication Data

US 2014/0014820 A1 Jan. 16, 2014

Related U.S. Application Data

(63) Continuation of application No. PCT/JP2013/059006, filed on Mar. 27, 2013.

(30) Foreign Application Priority Data

Apr. 16, 2012 (JP) ................................ 2012-093144

(51) Int. Cl.
*H01L 27/00* (2006.01)
*H04N 5/235* (2006.01)
*A61B 1/04* (2006.01)

(52) U.S. Cl.
USPC ........ 250/208.1; 600/109; 600/160; 600/180; 348/362

(58) Field of Classification Search
USPC ................... 250/208.1, 205; 348/362, 68, 69; 600/109, 160, 178, 180
See application file for complete search history.

(56) References Cited

U.S. PATENT DOCUMENTS

| | | | |
|---|---|---|---|
| 8,231,522 B2 * | 7/2012 | Endo et al. .................... | 600/109 |
| 2011/0001859 A1 | 1/2011 | Matsuura et al. | |
| 2012/0016200 A1 | 1/2012 | Seto et al. | |

FOREIGN PATENT DOCUMENTS

| | | |
|---|---|---|
| EP | 2 407 087 A2 | 1/2012 |
| JP | 2007-318581 A | 12/2007 |
| JP | 2009-124260 A | 6/2009 |
| JP | 2010-262224 A | 11/2010 |
| JP | 2011-015222 A | 1/2011 |
| JP | 2011-030985 A | 2/2011 |
| JP | 2012-019982 A | 2/2012 |

\* cited by examiner

*Primary Examiner* — Thanh Luu
(74) *Attorney, Agent, or Firm* — Scully, Scott, Murphy & Presser, P.C.

(57) ABSTRACT

An image pickup system that performs image pickup control of a rolling shutter type such that an all line exposure period and a non-all line exposure period are generated and controls a light source of illumination light to increase or decrease, in a first light adjustment mode, while maintaining a light amount of the illumination light in a first period during the all line exposure period at a predetermined level, a light amount of the illumination light during a second period including the all line exposure period other than the first period and the non-all line exposure period compared with an immediately preceding second period.

6 Claims, 6 Drawing Sheets

IMAGE PICKUP SYSTEM AND IMAGE PICKUP METHOD

CROSS REFERENCE TO RELATED APPLICATION

This application is a continuation application of PCT/JP2013/059006 filed on Mar. 27, 2013 and claims benefit of Japanese Application No. 2012-093144 filed in Japan on Apr. 16, 2012, the entire contents of which are incorporated herein by this reference.

BACKGROUND OF THE INVENTION

1. Field of the Invention

The present invention relates to an image pickup system of a rolling shutter type and an image pickup method for sequentially performing exposure of an image pickup device for each of horizontal lines.

2. Description of the Related Art

In an image pickup apparatus, a CCD image sensor has been widely used. However, in recent years, a CMOS image sensor (hereinafter simply referred to as CMOS) has also started to be widely used. The CMOS consumes low power. Peripheral circuits can be formed on the same substrate in the CMOS. In a field of an electronic endoscope, an endoscope system using the CMOS has started to be proposed.

Incidentally, in the CMOS, in general, a rolling shutter type in which readout of pixel signals is performed in order for each one horizontal line is adopted.

Examples of an image pickup apparatus using such a CMOS of the rolling shutter type include an image pickup apparatus described in Japanese Patent Application Laid-Open Publication No. 2009-124260. Application examples of the CMOS in an endoscope apparatus include an endoscope apparatus described in Japanese Patent Application Laid-Open Publication No. 2011-30985.

Incidentally, in the case of the rolling shutter type, a state in which a line during exposure and a line during non-exposure are present at the same point of time occurs. When flush light emission (glint light emission) is performed at such a point of time, a line on which an object illuminated by illumination light is exposed and a line on which the object is exposed without being illuminated by the illumination light are generated.

Therefore, in the techniques described in Japanese Patent Application Laid-Open Publication No. 2009-124260 and Japanese Patent Application Laid-Open Publication No. 2011-30985, the apparatus is controlled to irradiate illumination light in an exposure period common to all lines (an all line exposure period or a global exposure period) to perform photographing.

It is conceivable to set a light amount change relatively gentle with respect to timing of image pickup (about 10 Hz at the highest). Such a gentle light amount change is performed in, for example, a light source apparatus including a light adjustment mechanism such as a mechanical diaphragm mechanism.

It is also conceivable to gently subject a light source (e.g., an LED light source) to current light adjustment (e.g., at about 10 Hz) instead of the gentle light amount change by the mechanical diaphragm mechanism.

For example, Japanese Patent Application Laid-Open Publication No. 2007-318581 describes an image pickup apparatus including an image pickup device such as a CMOS, image pickup device drive controlling means for controlling exposure of the image pickup device and readout driving in the rolling shutter type, frame cycle controlling means for controlling a frame cycle, a photographing auxiliary light source configured by an LED light or the like, and auxiliary light source drive controlling means for controlling the photographing auxiliary light source in PWM driving. In a technique described in the publication, in synchronization with an exposure start period for each of respective lines by a rolling shutter, the LED light is caused to perform pulse light emission and a light emission pulse is subjected to PWM control, whereby a light emission amount is adjusted (line light adjustment: see, for example, FIG. 3 and the like of the publication).

The technique described in Japanese Patent Application Laid-Open Publication No. 2007-318581 is a technique for subjecting the light emission pulse to PWM light adjustment for each one horizontal line period. Therefore, further, it is possible to use current light adjustment together with the PWM light adjustment.

Incidentally, in general, one horizontal line period is about several ten its. On the other hand, in a large-power LED driver used in an endoscope light source, generatable minimum pulse width is about several μs.

SUMMARY OF THE INVENTION

An image pickup system according to a certain aspect of the present invention includes: an image pickup device in which a plurality of pixels for performing photoelectric conversion are arrayed in a two-dimensional shape in units of horizontal lines; an image pickup control unit configured to set a predetermined exposure period to be longer than a period required for readout of all horizontal lines and cause the image pickup device to sequentially start exposure of the image pickup device for each of the horizontal lines, and, after causing the image pickup device to start exposure of a last horizontal line, cause the image pickup device to sequentially perform readout for each of the horizontal lines on which the predetermined exposure period elapses from the exposure start to thereby control the image pickup device such that an all line exposure period in which all the horizontal lines are simultaneously exposed and a non-all line exposure period other than the all line exposure period in a period in which any one of the horizontal lines is exposed are generated; a light source configured to emit illumination light emitted to an object which is a target of image pickup by the image pickup device; a light source driving unit configured to drive the light source to be capable of adjusting a light amount of the illumination light; and a light adjustment controlling unit configured to control the light source driving unit to increase or decrease, in a first light adjustment mode, while maintaining a light amount of the illumination light in a first period during the all line exposure period at a predetermined level, a light amount of the illumination light during a second period including the all line exposure period other than the first period and the non-all line exposure period compared with an immediately preceding second period.

An image pickup method according to another aspect of the present invention is a method including: setting, in image pickup control for an image pickup device in which a plurality of pixels for performing photoelectric conversion are arrayed in a two-dimensional shape in units of horizontal lines, a predetermined exposure period to be longer than a period required for readout of all horizontal lines; emitting, from a light source, illumination light emitted to an object which is a target of image pickup by the image pickup device; sequentially starting exposure of the image pickup device for each of the horizontal lines; sequentially performing, after starting exposure of a last horizontal line, readout for each of the horizontal lines on which the predetermined exposure period elapses from the exposure start; and increasing or decreasing, in a first light adjustment mode, while maintaining a light amount of the illumination light in a first period during an all line exposure period, in which all the horizontal lines are simultaneously exposed, at a predetermined level, a light amount of the illumination light during a second period including a non-all line exposure period other than the all line exposure period in a period in which any one of the horizontal lines is exposed and the all line exposure period other than the first period compared with an immediately preceding second period.

DETAILED DESCRIPTION OF THE PREFERRED EMBODIMENT

An embodiment of the present invention is explained below with reference to the drawings.

First Embodiment

Figure 1:
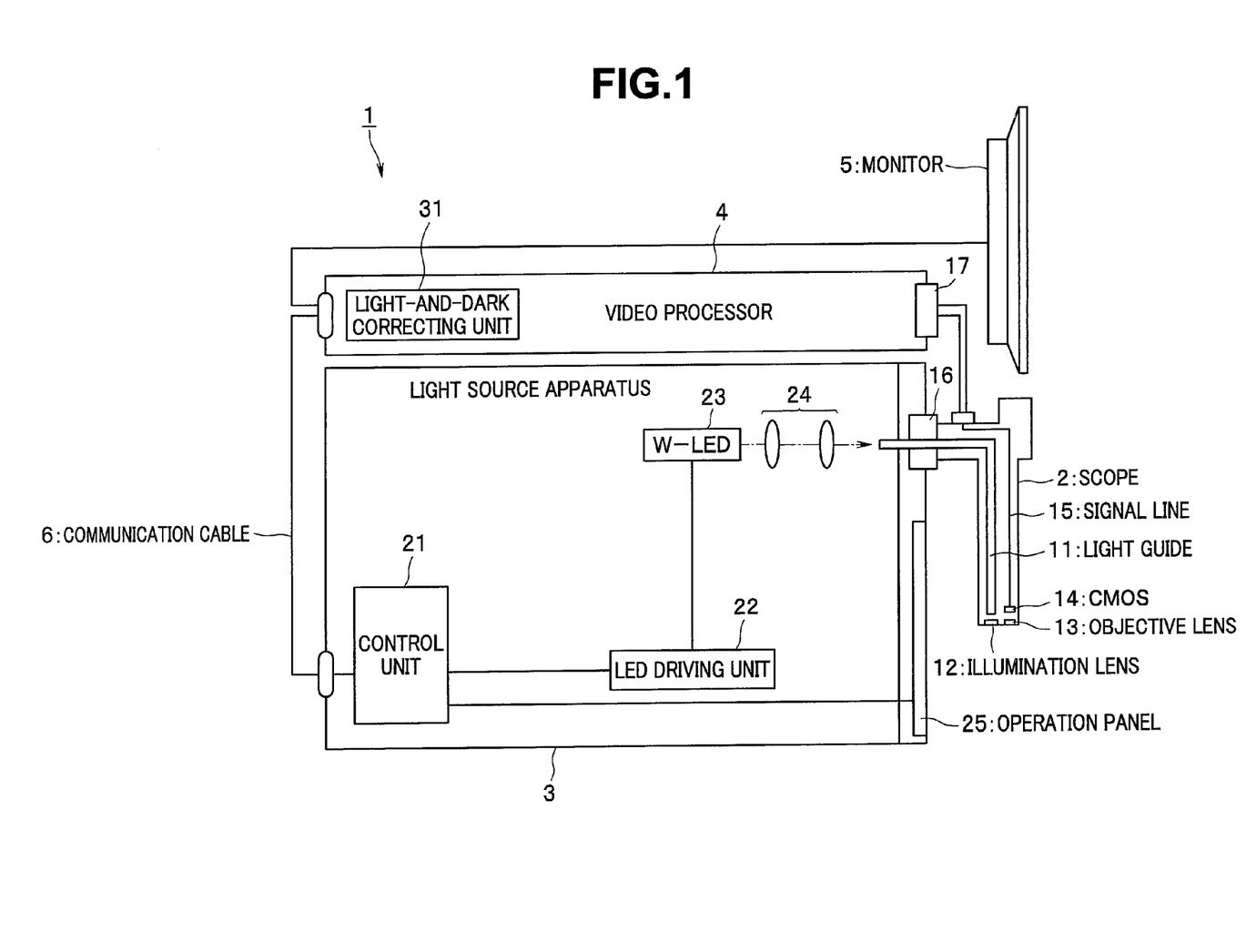
FIG. 1 is a diagram showing a configuration of an endoscope system in a first embodiment of the present invention.

FIGS. 1 to 6 are diagrams showing a first embodiment of the present invention. FIG. 1 is a diagram showing a configuration of an endoscope system.

In the present embodiment, as an example of an image pickup system, an endoscope system 1 is explained. However, the image pickup system is not limited to the endoscope system 1 and can be widely applied to systems including an image pickup function.

The endoscope system 1 includes a scope (an endoscope) 2, a light source apparatus 3, a video processor 4, a monitor 5, and a communication cable 6.

The light source apparatus 3 includes a control unit 21, an LED driving unit 22, a white LED (in the figure, described as W-LED) 23, an optical system 24, and an operation panel 25.

The white LED 23 is a light-emitting device configured to emit white light as illumination light and is a light source.

The LED driving unit 22 is a light source driving unit configured to supply an electric current to the white LED 23 and drive the white LED 23. The LED driving unit 22 is capable of adjusting, for example, by controlling the supplied electric current, a light amount of the illumination light emitted from the white LED 23. Here, as the current control by the LED driving unit 22, both of control of a current value and control of applied pulse width of the electric current (i.e., PWM control) are possible. The former control of a current value means controlling light emission luminance of the white LED 23 and the latter PWM control means controlling a light emission time of the white LED 23.

The control unit 21 is a light adjustment controlling unit configured to adjust, by controlling the electric current supplied from the LED driving unit 22 to the white LED 23, a light amount of the illumination light emitted from the white LED 23. The control by the control unit 21 is performed on the basis of a diaphragm control signal acquired by performing communication with the video processor 4 via the communication cable 6 or on the basis of brightness setting for the illumination light from a user via the operation panel 25.

The optical system 24 transmits the illumination light emitted from the white LED 23 and condenses the illumination light on an incident end face at a proximal end of a below-mentioned light guide 11 of the scope 2.

The operation panel 25 is used by the user to perform operation for the light source apparatus 3. The operation panel 25 enables the user to perform power ON/OFF operation for the light source apparatus 3, brightness setting operation for the illumination light, and the like.

The scope 2, which is an endoscope, configured to receive supply of the illumination light from the light source apparatus 3 includes a light guide 11, an illumination lens 12, an objective lens 13, a CMOS image sensor (CMOS) 14, a signal line 15, a light guide connector 16, and a video connector 17.

The proximal end of the light guide 11 is extended from the light guide connector 16. When the light guide connector 16 is connected to the light source apparatus 3, light from the white LED 23 is condensed on the incident end face at the proximal end of the light guide 11 by the optical system 24.

The light guide 11 is inserted through an insertion portion of the scope 2 to a distal end portion of the scope 2 and emits the illumination light from an emission surface at a distal end of the scope 2. The illumination lens 12 is disposed on an optical path of the illumination light. In this way, the illumination light from the light source apparatus 3, which is transmitted through the light guide 11, is emitted from the distal end of the insertion portion to an object which is a target of image pickup by the CMOS 14, via the illumination lens 12.

An optical image of the object irradiated with the illumination light is captured via the objective lens 13 disposed at the insertion portion distal end of the scope 2 and formed on the CMOS 14, which is an image pickup device. The CMOS 14 is a 1CCD color image pickup device in which a plurality of pixels for performing photoelectric conversion are arrayed two-dimensionally in units of horizontal lines and a color filter array of, for example, primary color Bayer array is further disposed on the pixel array. The CMOS 14 performs image pickup for converting the optical image of the object into an electric signal and transmits the electric signal (a 1CCD color image) to the video processor 4, to which the video connector 17 is connected, via the signal line 15.

The video processor 4 is an image pickup control unit configured to cause the CMOS 14 to sequentially start, for each of horizontal lines, exposure in one frame period (or a period for picking up one image such as one field period) of the CMOS 14 and cause the CMOS 14 to sequentially perform readout for each of the horizontal lines on which a predetermined exposure period (so-called shutter speed) elapses from the exposure start (i.e., perform exposure control by a so-called rolling shutter). Further, the video processor 4 sets the predetermined exposure period to be longer than a period required for readout of all the horizontal lines. Consequently, readout of a first horizontal line is performed after exposure of a last horizontal line is started. Therefore, the video processor 4 controls the CMOS 14 such that an all line exposure period in which all the horizontal lines are simultaneously exposed and a non-all line exposure period other than the all line exposure period in a period in which any one of the horizontal lines is exposed are generated.

The video processor 4 subjects the 1CCD color image received from the CMOS 14 to demosaicing (synchronization) to generate a color image (i.e., a 3CCD color image in which color signals of RGB three colors are aligned concerning the respective pixels). After performing color balance adjustment and image processing such as gamma conversion and color conversion of the generated color image, the video processor 4 converts the color image into a signal format for displaying the color image on the monitor 5 and outputs the color image to the monitor 5. The monitor 5 is a color monitor. Consequently, an image of the object is displayed in color on the monitor 5.

Figure 3:
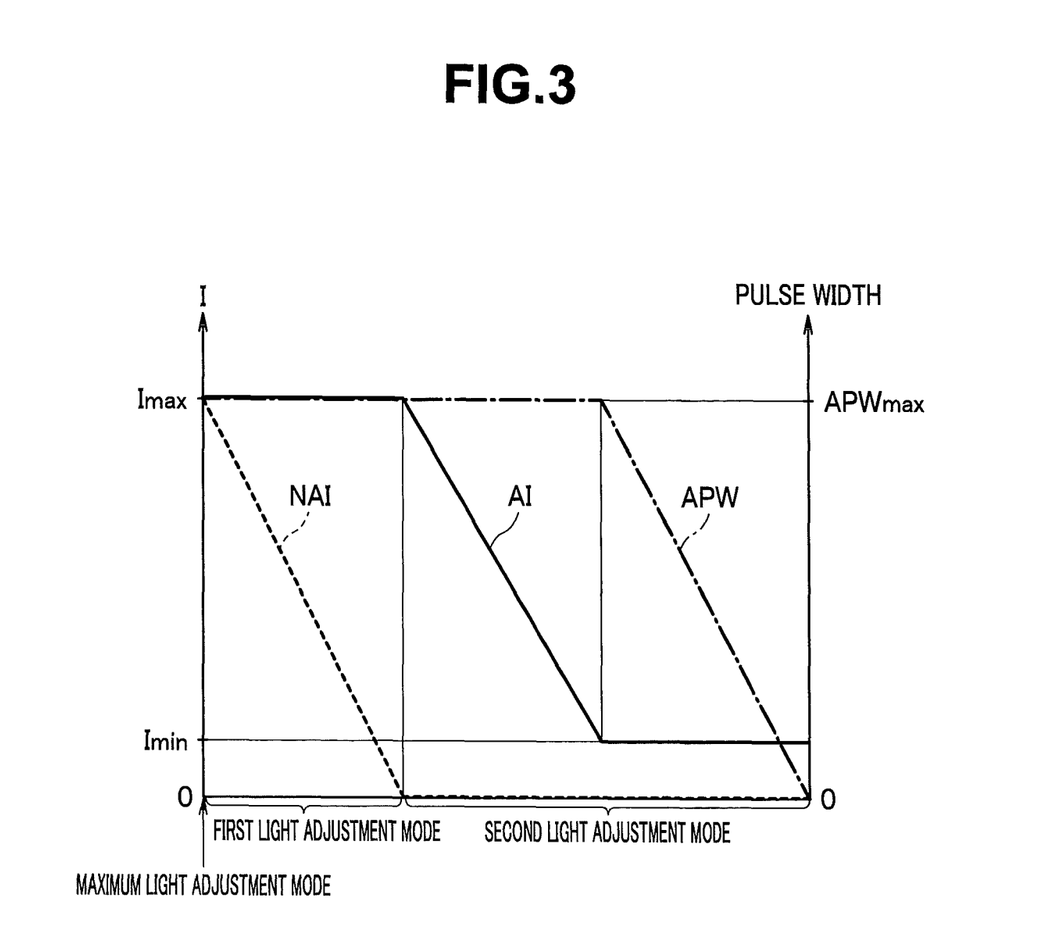
FIG. 3 is a line diagram showing states of current control and pulse width control in respective light adjustment modes in the first embodiment.

A light-and-dark correcting unit 31 is provided in the video processor 4. As explained below in detail, the light source apparatus 3 is configured to perform control of a light emission amount, that is, light adjustment by classifying the control into several different light adjustment modes (more specifically, as shown in FIG. 3, a maximum light adjustment mode, a first light adjustment mode, and a second light adjustment mode). When the video processor 4 performs the light adjustment in the first light adjustment mode among the light adjustment modes, if the light adjustment is used together with the rolling shutter by the CMOS 14, gentle gradation occurs in the object. Therefore, the light-and-dark correcting unit 31 corrects, on the basis of light amounts of the illumination light corresponding to the respective horizontal lines at the time when an image obtained by exposing the object with the CMOS 14 under illumination in the first light adjustment mode (an image with gentle gradation) is exposed, the image to be close to an image obtained when the light amounts of the illumination light corresponding to the respective horizontal lines are the same (an image without gradation).

Further, the video processor 4 extracts, for example, a luminance signal from the color image explained above and generates a diaphragm control signal on the basis of the extracted luminance signal. The video processor 4 also generates an all line exposure signal that changes to a high level at a point when exposure of the last horizontal line among all the horizontal lines is started and changes to a low level at a point when exposure of the first horizontal line among all the horizontal lines ends. The diaphragm control signal and the all line exposure signal generated by the video processor 4 in this way are transmitted to the control unit 21 of the light source apparatus 3 via the communication cable 6 that connects the video processor 4 and the light source apparatus 3.

The control unit 21 controls the LED driving unit 22 and performs light amount adjustment for the illumination light emitted from the white LED 23 on the basis of the received diaphragm control signal and the received all line exposure signal.

On the other hand, the control unit 21 of the light source apparatus 3 transmits light amount adjustment information of the illumination light to the video processor 4 via the communication cable 6. The light-and-dark correcting unit 31 corrects, on the basis of the received light amount adjustment information of the illumination light, a difference in brightness of an image based on a difference in a light amount of the illumination light during exposure for each of the horizontal lines.

Figure 2:
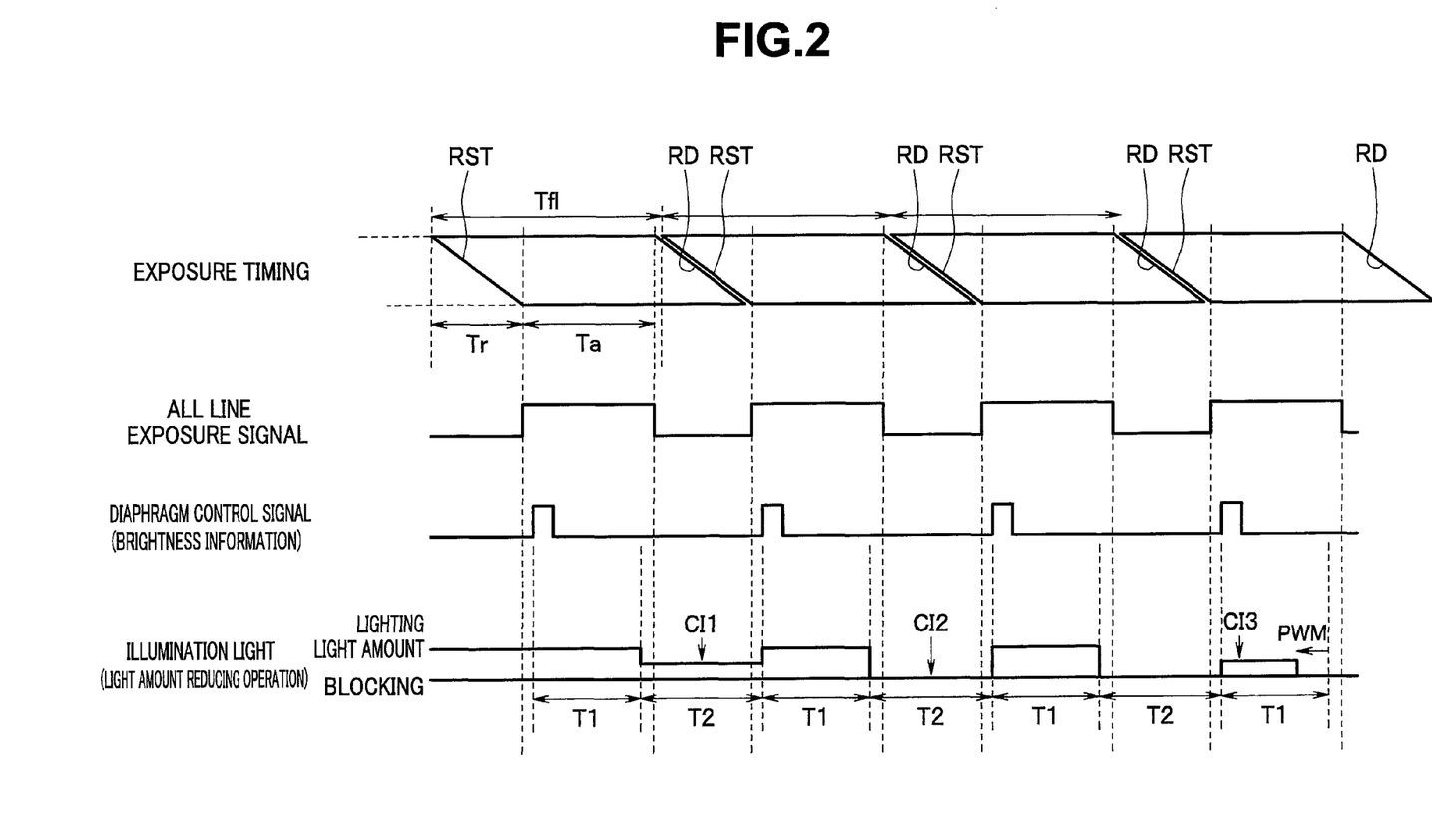
FIG. 2 is a timing chart showing exposure timing of a CMOS and a light adjustment operation of a light source apparatus in the first embodiment.

FIG. 2 is a timing chart showing exposure timing of the CMOS 14 and a light adjustment operation of the light source apparatus 3.

The CMOS 14 resets the respective pixels in order for each of the horizontal lines (reset timing RST), whereby exposure is started. The CMOS 14 reads out, in order, pixel data from the horizontal line on which a predetermined exposure period ((Tr+Ta) shown in FIG. 2) elapses (readout timing RD), whereby the exposure ends.

Note that the exposure period (Tr+Ta) is set to a period equal to or shorter than one frame period Tf1 (in an example shown in FIG. 2, a period slightly shorter than the one frame period Tf1).

As explained above, the video processor 4 performs control such that the exposure period (Tr+Ta) is longer than a period Tr required for readout of all the horizontal lines. Therefore, an all line exposure period Ta in which all the horizontal lines are simultaneously exposed is positive (Ta>0). Consequently, exposure of the last horizontal line is started before readout of the horizontal line on which exposure is started first is started. A period (e.g., the period Tr) in which at least one horizontal line is exposed but that is not the all line exposure period Ta is a non-all line exposure period.

The video processor 4 generates, as the all line exposure signal, a signal that changes to, for example, the high level in the all line exposure period Ta and changes to, for example, the low level in a period other than the all line exposure period Ta and transmits the signal to the control unit 21 of the light source apparatus 3.

The video processor 4 generates a diaphragm control signal (e.g., a signal for maintaining a light amount of the illumination light in a present state, a signal indicating how much the light amount of the illumination light can be reduced from the present state, or a signal indicating how much the light amount of the illumination light can be increased from the present state) and transmits the diaphragm control signal to the control unit 21, for example, at a point when some time elapses after the all line exposure period Ta is started as shown in FIG. 2.

The light source apparatus 3 receives the all line exposure signal and the diaphragm control signal from the video processor and performs light amount adjustment (light adjustment) for the illumination light. The light adjustment is explained with reference to FIG. 3 as well. FIG. 3 is a line diagram showing states of current control and pulse width control in the respective light adjustment modes.

First, the example of the light adjustment shown in FIG. 2 indicates a state in which a light amount is gradually reduced from a point when illumination is performed with a maximum light amount (a point of the maximum light adjustment mode).

In the maximum adjustment mode, as shown in FIG. 3, both of an electric current AI applied in a first period T1 during the all line exposure period Ta and an electric current NAI applied in a second period T2 including the all line exposure period Ta other than the first period T1 and the non-all line exposure period Tr are a maximum current (a maximum rated current) Imax that can be supplied as an electric current I.

When the light amount of the illumination light is reduced from the maximum light adjustment mode, first, the light adjustment enters the first light adjustment mode. The first light adjustment mode is a mode for increasing or decreasing, while maintaining the electric current AI applied in the first period T1 at the maximum current Imax (i.e., maintaining the light amount of the illumination light in the first period T1 during the all line exposure period Ta at a predetermined level), only the electric current NAI applied in the second period T2 to be close to a target light amount compared with an immediately preceding second period T2 (however, in one second period T2, maintaining the electric current NAI at a fixed value without changing the electric current NAI). (Note that "increasing or decreasing" herein also includes present state maintenance, that is, 0 increase or 0 decrease. The same applies below.). That is, the first light adjustment mode is a mode in which the control unit 21 causes the LED driving unit 22 to adjust a current amount per unit time supplied to the white LED 23, which is a light source, in the second period T2 to thereby increase or decrease the light amount of the illumination light compared with the immediately preceding second period T2. Consequently, the light amount of the illumination light during the second period T2 (see, for example, an arrow CI2) is increased or decreased compared with the light amount of the illumination light in the immediately preceding second period T2 (see, an arrow CI1).

Note that, in the example shown in FIG. 2, to provide a margin taking into account deviation of timing control or the like, the first period T1 is set slightly shorter on a start point side and an end point side than an entire period of the all line exposure period Ta. However, if the deviation of timing control does not have to be taken into account, it is desirable to match the first period T1 to the all line exposure period Ta.

The first light adjustment mode ends at a point when the electric current NAI applied in the second period T2 decreases to 0 (see an arrow CI2 in FIG. 2). When the light amount of the illumination light is further reduced, next, the light adjustment enters the second light adjustment mode. The second light adjustment mode is a mode for concurrently using current control (see an arrow CI3 in FIG. 2) for increasing or decreasing, while maintaining the electric current NAI applied in the second period T2 zero (i.e., while maintaining the light amount of the illumination light during the second period T2 zero), the electric current AI applied in the first period T1 compared with the immediately preceding first period T1 (however, in one first period T1, maintaining the electric current AI at a fixed value without changing the electric current AI) and pulse width control (PWM control) see an arrow PWM in FIG. 2) for increasing or decreasing an applying period of the electric current AI during the first period T1 compared with the immediately preceding first period T1. That is, the second light adjustment mode is a mode that the control unit 21 causes the LED driving unit 22 to perform concurrently using adjustment of electric energy per unit time supplied to the white LED 23, which is the light source, in the first period T1 and adjustment of a power supply period (pulse width) in the first period T1. Therefore, in the second light adjustment mode, the light amount of the illumination light during the first period T1 is increased or decreased compared with the immediately preceding first period T1 in a range of a light amount equal to or smaller than a predetermined level (a light amount at the time when the maximum current Imax is applied) in the first light adjustment mode.

In an example shown in FIG. 3, when the light adjustment enters the second light adjustment mode, first, the control unit 21 performs only the current control while maintaining pulse width (a power supply period) APW in the PWM control at maximum pulse width APWmax (the maximum pulse width APWmax is pulse width corresponding to the entire first period T1). The control unit 21 stops the current control when the electric current AI reaches a minimum current Imin. Subsequently, the control unit 21 shifts to the PWM control. The PWM control is performed by controlling the pulse width APW of the electric current AI in the first period T1 between the maximum pulse width APWmax and minimum pulse width (e.g., pulse width 0).

Note that, in the example shown in FIG. 3, when the light adjustment enters the second light adjustment mode from the first light adjustment mode, first, the control unit 21 preferentially performs the current control and shifts to the PWM control when the light adjustment reaches a limit of an adjustment range by the current control. However, the light adjustment control by the control unit 21 is not limited to this. For example, the control unit 21 may preferentially perform the PWM control and thereafter shift to the current control or may concurrently perform the PWM control and the current control. It goes without saying that the control unit 21 may perform the PWM control and the current control according to stepwise level adjustment having step width.

The minimum current Imin is set to non-zero in the current control and the minimum pulse width is set to zero in the PWM control. However, the minimum current Imin and the minimum pulse width are not limited to this. That is, the minimum current Imin may be set to zero or the minimum pulse width in the PWM control may be set to non-zero. Zero/non-zero of the minimum current Imin and zero/non-zero of the minimum pulse width can be arbitrarily combined.

Figure 4:
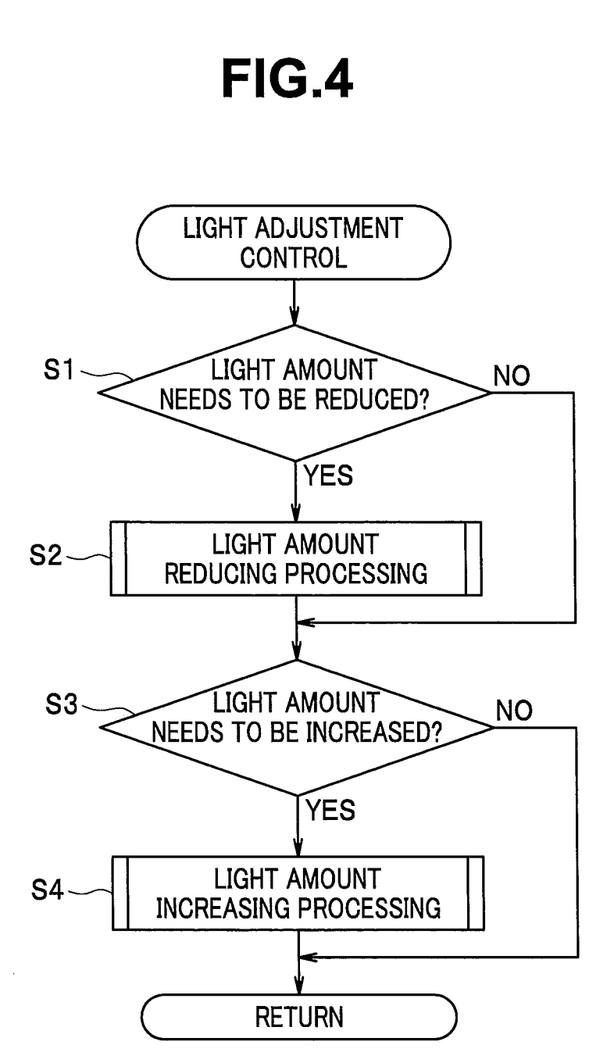
FIG. 4 is a flowchart showing processing of light adjustment control by a control unit of the light source apparatus in the first embodiment.

Next, FIG. 4 is a flowchart showing processing of the light adjustment control by the control unit 21 of the light source apparatus 3.

Upon starting the processing of the light adjustment control, the control unit 21 determines, on the basis of the diaphragm control signal received from the video processor 4, whether a light amount needs to be reduced (step S1).

Figure 5:
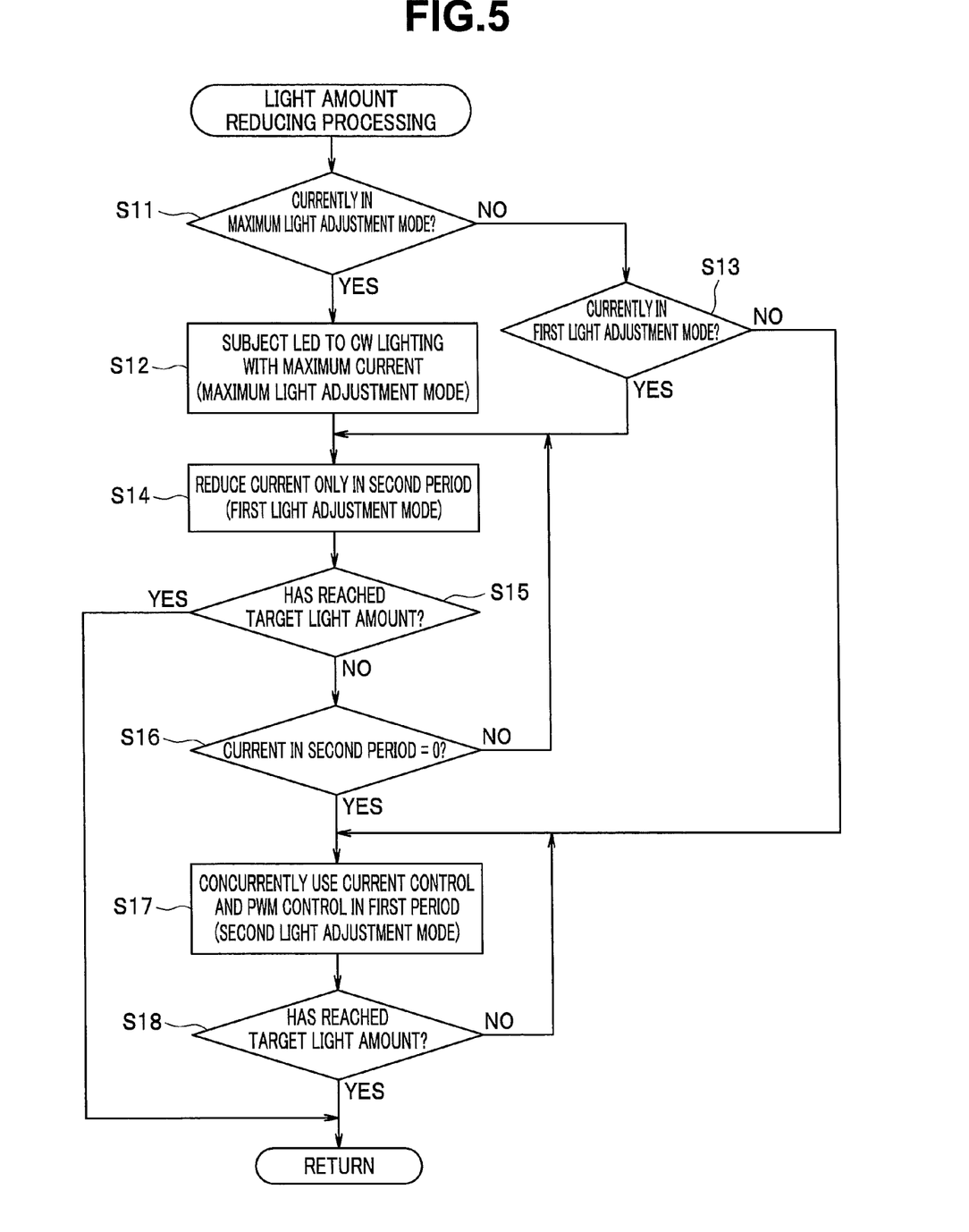
FIG. 5 is a flowchart showing details of light amount reducing processing in step S2 in FIG. 4 in the first embodiment.

When the control unit 21 determines that the light amount needs to be reduced, the control unit 21 performs light amount reducing processing shown in FIG. 5 (step S2).

When the light amount reducing processing ends or the control unit 21 determines in step S1 that the light amount does not need to be reduced, the control unit 21 determines whether the light amount needs to be increased (step S3).

Figure 6:
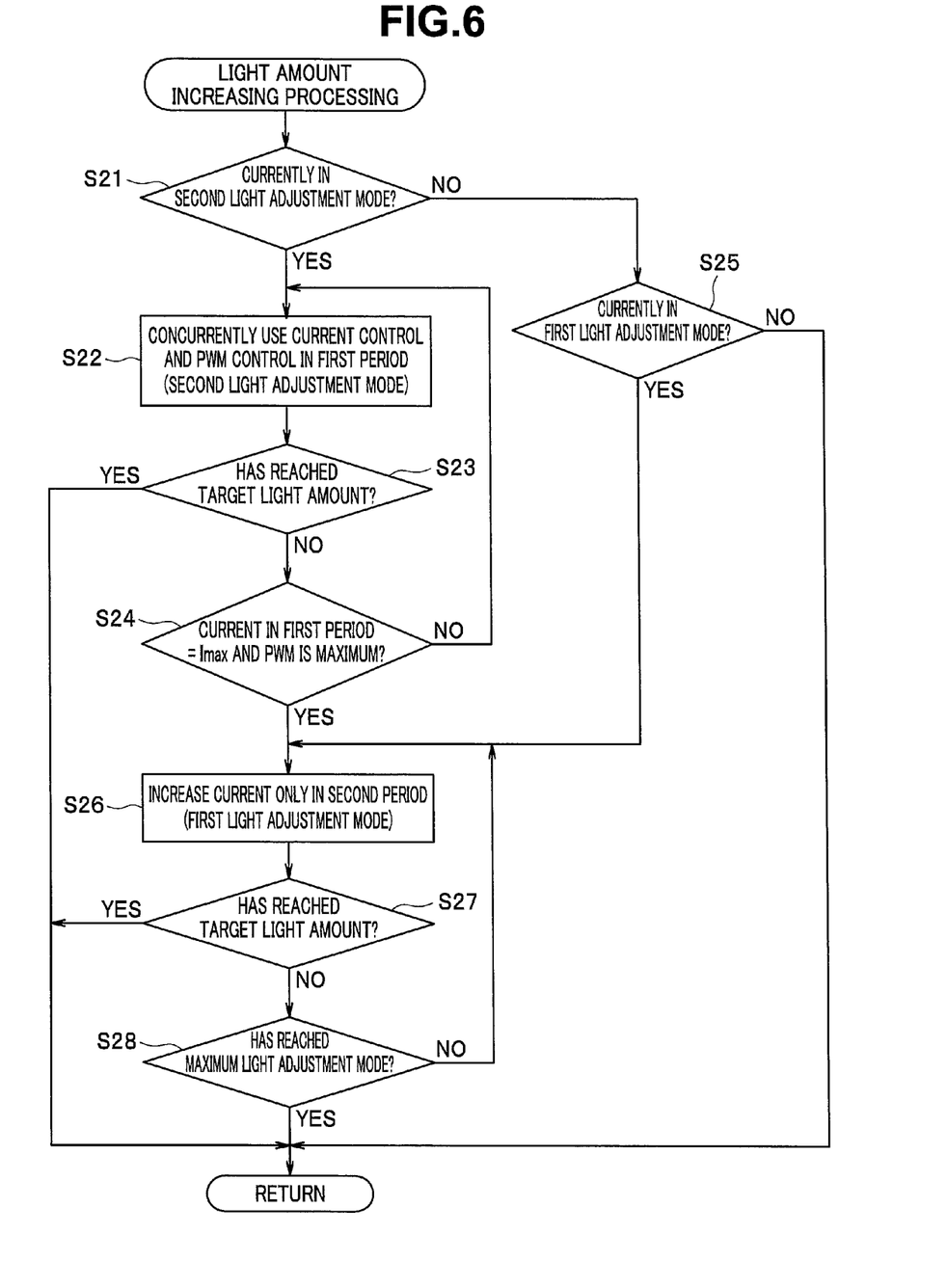
FIG. 6 is a flowchart showing details of light amount increasing processing in step S4 in FIG. 4 in the first embodiment.

When the control unit 21 determines that the light amount needs to be increased, the control unit 21 performs light amount increasing processing shown in FIG. 6 (step S4).

When the light amount increasing processing ends or the control unit 21 determines in step S3 that the light amount does not need to be increased, the control unit 21 ends the processing of the light adjustment control and returns to a not-shown main routine or the like.

Subsequently, FIG. 5 is a flowchart showing details of the light amount reducing processing in step S2 in FIG. 4.

Upon entering the light amount reducing processing, the control unit 21 determines whether the light adjustment is currently in the maximum light adjustment mode (step S11).

When the control unit 21 determines that the light adjustment is currently in the maximum light adjustment mode, the control unit 21 subjects the white LED 23 to CW (continuous wave) lighting with the maximum current Imax via the LED driving unit 22 (step S12).

When the control unit 21 determines in step S11 that the light adjustment is not currently in the maximum light adjustment mode, the control unit 21 further determines whether the light adjustment is currently in the first light adjustment mode (step S13).

When the processing in step S12 ends or the control unit 21 determines in step S13 that the light adjustment is currently in the first light adjustment mode, the control unit 21 performs processing of the first light adjustment mode for reducing the electric current NAI only in the second period T2 (step S14).

Thereafter, the control unit 21 determines whether the light amount has reached a target light amount (step S15).

When the control unit 21 determines that the light amount has not reached the target light amount, the control unit 21 determines whether the electric current NAI in the second period T2 has decreased to 0 (step S16).

When the control unit 21 determines that the electric current NAI has not decreased to 0 yet, the control unit 21 returns to step S14 and continuously performs processing of the first light adjustment mode.

On the other hand, when the control unit 21 determines in step S16 that the electric current NAI has decreased to 0 or determines in step S13 that the light adjustment is not currently in the first light adjustment mode, the control unit 21 performs processing of the second light adjustment mode for reducing the light amount concurrently using the current control and the PWM control in the first period T1 (step S17).

Thereafter, the control unit 21 determines whether the light amount has reached the target light amount (step S18).

When the control unit 21 determines that the light amount has not reached the target light amount, the control unit 21 returns to step S17 and continuously performs processing of the second light adjustment mode.

When the control unit 21 determines in step S15 or step S18 that the light amount has reached the target light amount, the control unit 21 returns from the light amount reducing processing to the processing of the light adjustment control shown in FIG. 4.

Further, FIG. 6 is a flowchart showing details of the light amount increasing processing in step S4 in FIG. 4.

Upon entering the light amount increasing processing, the control unit 21 determines whether the light adjustment is currently in the second light adjustment mode (step S21).

When the control unit 21 determines that the light adjustment is currently in the second light adjustment mode, the control unit 21 performs the processing of the second light adjustment mode for increasing the light amount concurrently using the current control and the PWM control in the first period T1 (step S22).

Subsequently, the control unit 21 determines whether the light amount has reached the target light amount (step S23).

When the control unit 21 determines that the light amount has not reached the target light amount, the control unit 21 determines whether the electric current AI in the first period T1 is the maximum current Imax and the pulse width in the PWM control is the maximum pulse width APWmax (step S24).

When the control unit 21 determines in step S24 that the electric current AI is not the maximum current Imax or the pulse width is not the maximum value, the control unit 21 returns to step S22 and continuously performs the processing of the second light adjustment mode.

When the control unit 21 determines in step S21 that the light adjustment is not currently in the second light adjustment mode, the control unit 21 further determines whether the light adjustment is currently in the first light adjustment mode (step S25).

When the control unit 21 determines in step S24 that the electric current AI is the maximum current Imax and the pulse width is the maximum value or determines in step S25 that the light adjustment is currently in the first light adjustment mode, the control unit 21 performs the processing of the first light adjustment mode for increasing the electric current NAI only in the second period T2 (step S26).

Thereafter, the control unit 21 determines whether the light amount has reached the target light amount (step S27).

When the control unit 21 determines that the light amount has not reached the target light amount, the control unit 21 further determines whether the light adjustment has reached the maximum light adjustment mode (step S28).

When the control unit 21 determines that the light adjustment has not reached the maximum light adjustment mode, the control unit 21 returns to step S26 and continuously performs the processing of the first light adjustment mode.

In this way, when the control unit 21 determines in step S23 or step S27 that the light amount has reached the target light amount, determines in step S28 that the light adjustment has reached the maximum light adjustment mode, or determines in step S25 that the light adjustment is not currently in the first light adjustment mode (i.e., is in the maximum light adjustment mode), the control unit 21 returns from the light amount increasing processing to the processing of the light adjustment control shown in FIG. 4.

Light and dark in an image obtained by such processing is as explained below.

First, an image obtained by exposing the object under illumination of the maximum light adjustment mode is an image of the object illuminated with a continuous maximum light amount by continuous application of the maximum current Imax. Therefore, if an influence of environmental light (natural light, etc) is excluded (the same applies below), a light and dark fringe, a gradation, and the like do not occur.

An image obtained by exposing the object under illumination of the second light adjustment mode is an image of the object illuminated in only the first period T1 in the all line exposure period Ta. Therefore, similarly, a light and dark fringe, a gradation, and the like do not occur.

On the other hand, in an image obtained by exposing the object under illumination of the first light adjustment mode, an illumination light amount irradiated on the object in the first period T1 is fixed in all the horizontal lines. However, illumination light amounts in the second periods T2 before and after the first period T1 are different. Therefore, a gradation occurs according to in what balance the illumination light amount in the second period T2 immediately preceding the first period T1 and the illumination light amount in the second period T2 immediately following the first period T1 the object is exposed on a horizontal line (however, a clear light and dark fringe does not occur).

More specifically, in FIG. 2, when the illumination light amount in the immediately preceding second period T2 is the illumination light indicated by the arrow CI1 and the illumination light amount in the immediately following second period T2 is the illumination light indicated by the arrow CI2, an illumination light amount corresponding to a top horizontal line is the largest, illumination light amounts gradually decrease downward, and an illumination light amount corresponding to a bottom horizontal line is the smallest. Therefore, a gradation lighter on an upper side and darker on a lower side of an image occurs.

If light adjustment is performed at changing speed of a cycle of, for example, about 10 Hz, the gradation can be reduced to a level that hardly causes a sense of discomfort in practical use (if such light adjustment is performed, it is possible to omit the light-and-dark correcting unit 31).

When it is desired to more strictly remove the gradation or the light adjustment is performed at changing speed of a cycle shorter than about 10 Hz, the light-and-dark correcting unit 31 provided in the video processor 4 performs processing for correcting the gradation.

That is, the light-and-dark correcting unit 31 performs, on the basis of the light amount adjustment information of the illumination light acquired from the control unit 21, correction processing for gain-adjusting and offsetting, for example, for each of the horizontal lines, the gradation that occurs in the image obtained by exposing the object under the illumination of the first light adjustment mode (i.e., correction processing for correcting the image to be closer to an image obtained when light amounts of the illumination light corresponding to the respective horizontal lines are the same).

Note that the light-and-dark correcting unit 31 is not limited to acquire the light amount adjustment information of the illumination light from the control unit 21 and perform the correction processing but may predict, on the basis of the diaphragm control signal transmitted from the video processor 4 to the control unit 21, a gradation that occurs in one image and perform the correction processing. In this case, since it is unnecessary to wait for communication of a light adjustment result from the control unit 21, it is possible to more quickly obtain a processing result (i.e., obtain quicker light adjustment responsiveness).

According to such a first embodiment, in the image pickup system using the image pickup device that sequentially performs exposure for each of the horizontal lines, the light adjustment control explained above is performed by being divided into the plurality of light adjustment modes according to illumination light amounts. Consequently, it is possible to perform light adjustment (light amount reduction) in a wide dynamic range while suppressing a light and dark fringe of an image. More specifically, by performing the light adjustment control in the first light adjustment mode, it is possible to perform light adjustment asymptotic to the light adjustment in the maximum light adjustment mode. It is possible to suppress a light and dark fringe of an image while securing a maximum light amount. Further, by performing the light adjustment control in the second light adjustment mode, it is possible to perform light adjustment in a wide dynamic range (e.g., a minimum light amount is, for example, about one several thousandths of a maximum light amount).

The second light adjustment mode is a mode for controlling only a light emission amount in the first period T1 in the all line exposure period Ta. Therefore, a light and dark fringe does not occur. It is possible to perform control at a high degree of freedom.

Further, even in the case of the first light adjustment mode in which a gentle gradation is likely to occur, the light emitting device is lit with a light amount of a predetermined level (e.g., a maximum light amount) in the first period T1 (i.e., brightness of an entire image is relatively high). Therefore, even if an illumination light amount in the second period T2 slightly changes for each of the horizontal lines, contribution of the change to brightness is low. There is an advantage that a gradation is much less conspicuous.

Therefore, in the first light adjustment mode, it is desirable that the predetermined level of the light amount of the illumination light maintained during the first period T1 is a light amount level at the time when the maximum current Imax is applied. However, the predetermined level is not limited to this and may be a light amount level at the time when an electric current slightly lower than the maximum current Imax is applied.

Note that the image pickup system is mainly explained above. However, the present invention may be an image pickup method for controlling the image pickup system to perform image pickup as explained above or may be a control program for causing a computer to control the image pickup system as explained above, a computer-readable non-transient storage medium for recording the control program, and the like.

Note that the present invention is not limited to the embodiment per se. In an implementation stage, it is possible to modify and embody the elements without departing from the spirit of the present invention. It is possible to form various aspects of the invention according to appropriate combinations of the plural elements disclosed in the embodiment. For example, several elements may be deleted from all the elements disclosed in the embodiment. Further, the elements disclosed in the different embodiment may be suitably combined. In this way, it goes without saying that various modifications and applications are possible within a range not departing from the gist of the invention.

What is claimed is:

1. An image pickup system comprising:
an image pickup device in which a plurality of pixels for performing photoelectric conversion are arrayed in a two-dimensional shape in units of horizontal lines;
an image pickup control unit configured to set a predetermined exposure period to be longer than a period required for readout of all horizontal lines and cause the image pickup device to sequentially start exposure of the image pickup device for each of the horizontal lines, and, after causing the image pickup device to start exposure of a last horizontal line, cause the image pickup device to sequentially perform readout for each of the horizontal lines on which the predetermined exposure period elapses from the exposure start to thereby control the image pickup device such that an all line exposure period in which all the horizontal lines are simultaneously exposed and a non-all line exposure period other than the all line exposure period in a period in which any one of the horizontal lines is exposed are generated;
a light source configured to emit illumination light emitted to an object which is a target of image pickup by the image pickup device;
a light source driving unit configured to drive the light source to be capable of adjusting a light amount of the illumination light; and
a light adjustment controlling unit configured to control the light source driving unit to increase or decrease, in a first light adjustment mode, while maintaining a light amount of the illumination light in a first period during the all line exposure period at a predetermined level, a light amount of the illumination light during a second period including the all line exposure period other than the first period and the non-all line exposure period compared with an immediately preceding second period.

2. The image pickup system according to claim 1, wherein the light adjustment controlling unit further controls the light source driving unit to, in a second light adjustment mode in which the light amount of the illumination light during the second period decreases to zero, increase or decrease the light amount of the illumination light during the first period compared with an immediately preceding first period in a range of a light amount equal to or smaller than the predetermined level.

3. The image pickup system according to claim 2, wherein the light adjustment controlling unit controls, in the first light adjustment mode, the light source driving unit to adjust electric energy per unit time supplied to the light source in the second period to thereby increase or decrease the light amount of the illumination light compared with the immediately preceding second period and controls, in the second light adjustment mode, the light source driving unit to perform the mode concurrently using adjustment of electric energy per unit time supplied to the light source in the first period and adjustment of a power supply period in the first period to thereby increase or decrease the light amount of the illumination light compared with the immediately preceding first period in the range of the light amount equal to or smaller than the predetermined level.

4. The image pickup system according to claim 1, further comprising a light-and-dark correcting unit configured to correct, an image obtained by exposing the object with the image pickup device under illumination in the first light adjustment mode to be close to an image obtained when the light amounts of the illumination light corresponding to the respective horizontal lines are the same, on the basis of light amounts of the illumination light corresponding to the respective horizontal lines at the time when the image is exposed.

5. The image pickup system according to claim 1, wherein the first period is equal to the all line exposure period.

6. An image pickup method comprising:
   setting, in image pickup control for an image pickup device in which a plurality of pixels for performing photoelectric conversion are arrayed in a two-dimensional shape in units of horizontal lines, a predetermined exposure period to be longer than a period required for readout of all horizontal lines;
   emitting, from a light source, illumination light emitted to an object which is a target of image pickup by the image pickup device;
   sequentially starting exposure of the image pickup device for each of the horizontal lines;
   sequentially performing, after starting exposure of a last horizontal line, readout for each of the horizontal lines on which the predetermined exposure period elapses from the exposure start; and
   increasing or decreasing, in a first light adjustment mode, while maintaining a light amount of the illumination light in a first period during an all line exposure period, in which all the horizontal lines are simultaneously exposed, at a predetermined level, a light amount of the illumination light during a second period including a non-all line exposure period other than the all line exposure period in a period in which any one of the horizontal lines is exposed and the all line exposure period other than the first period compared with an immediately preceding second period.

* * * * *